May 1, 1928. 1,668,276
R. B. JONES
TRACTOR TRAILER COMBINATION
Filed Oct. 30, 1925 7 Sheets-Sheet 1
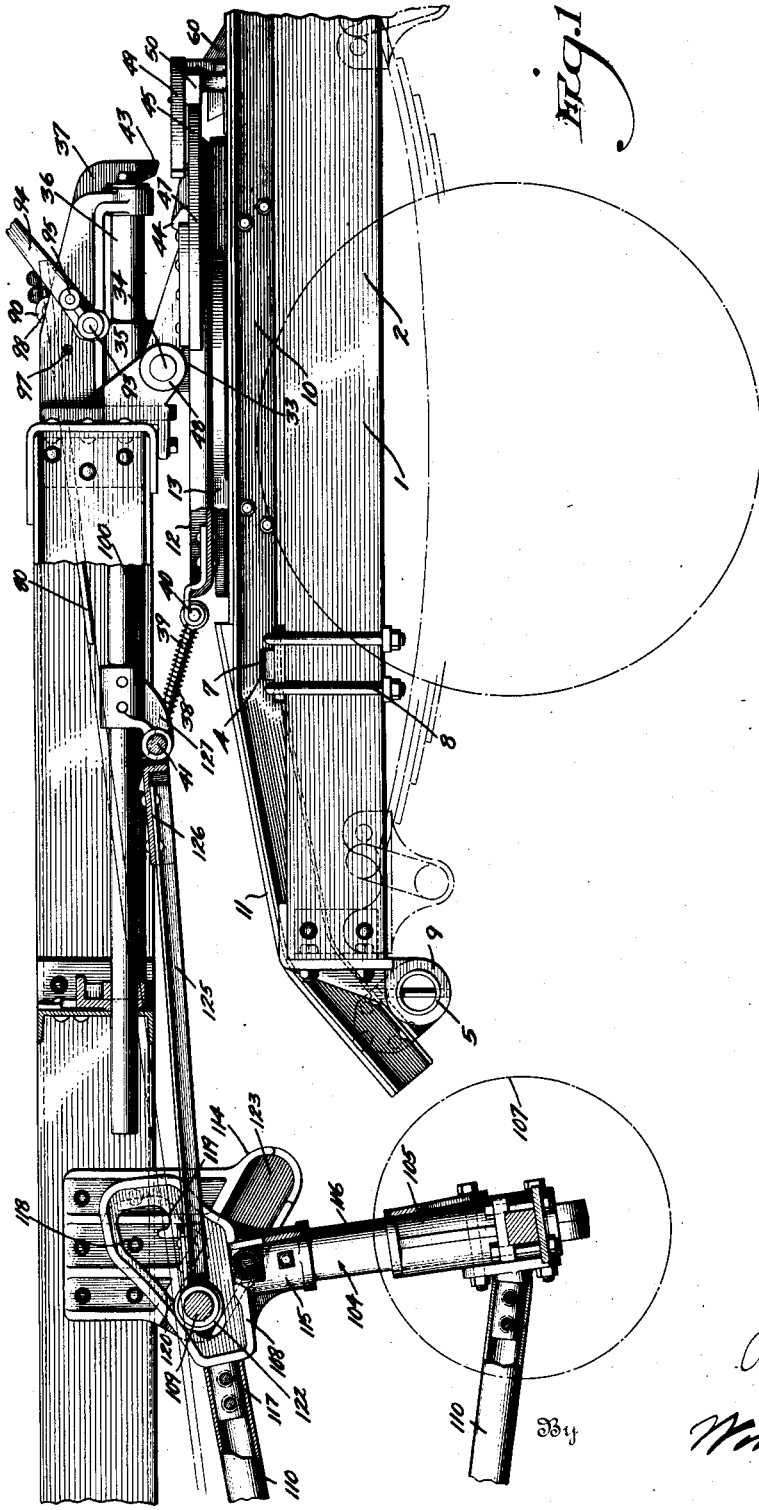
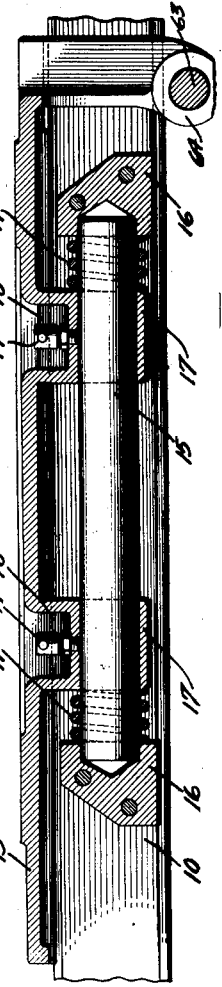
Inventor
Rufus B. Jones
By
Attorneys

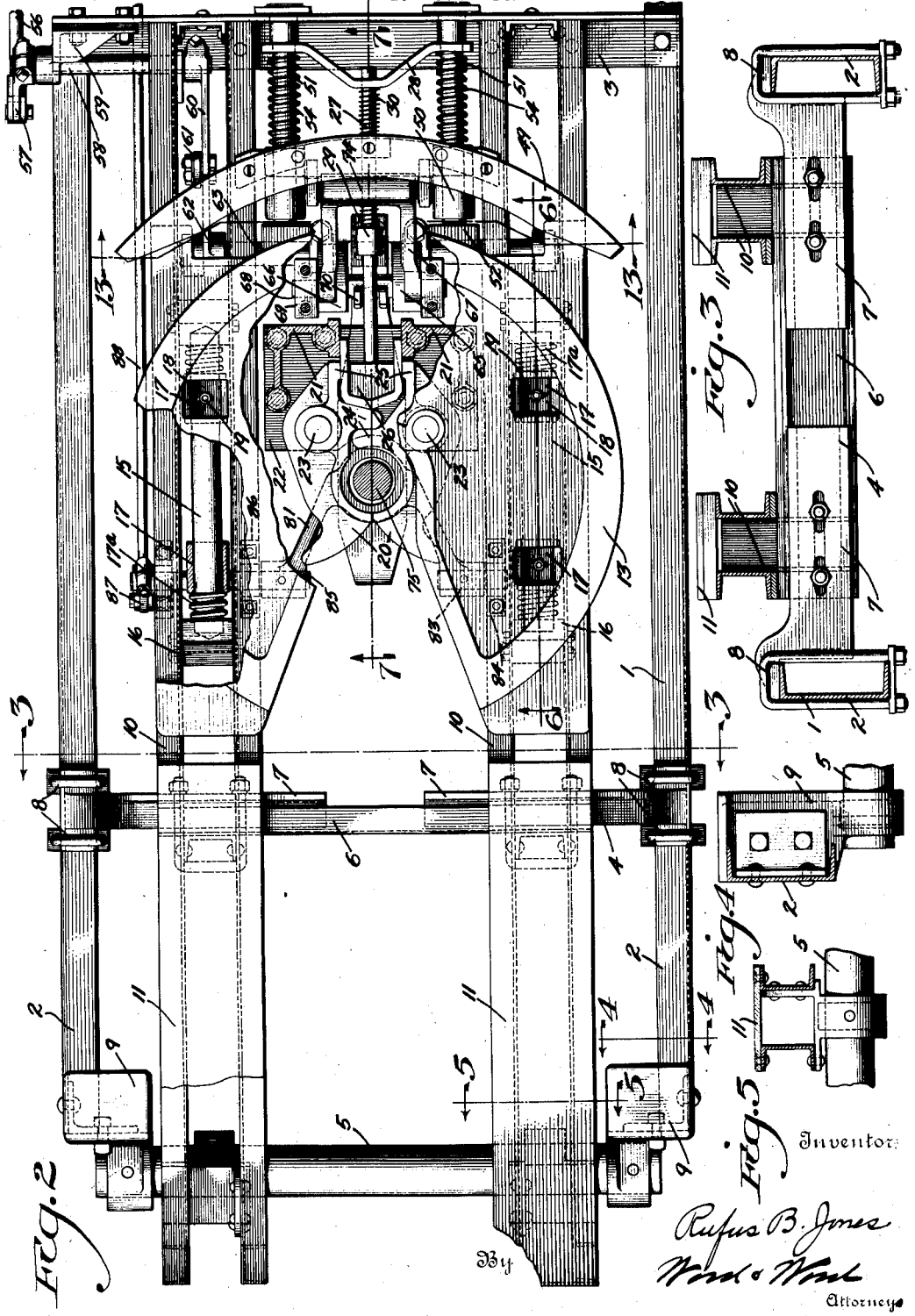

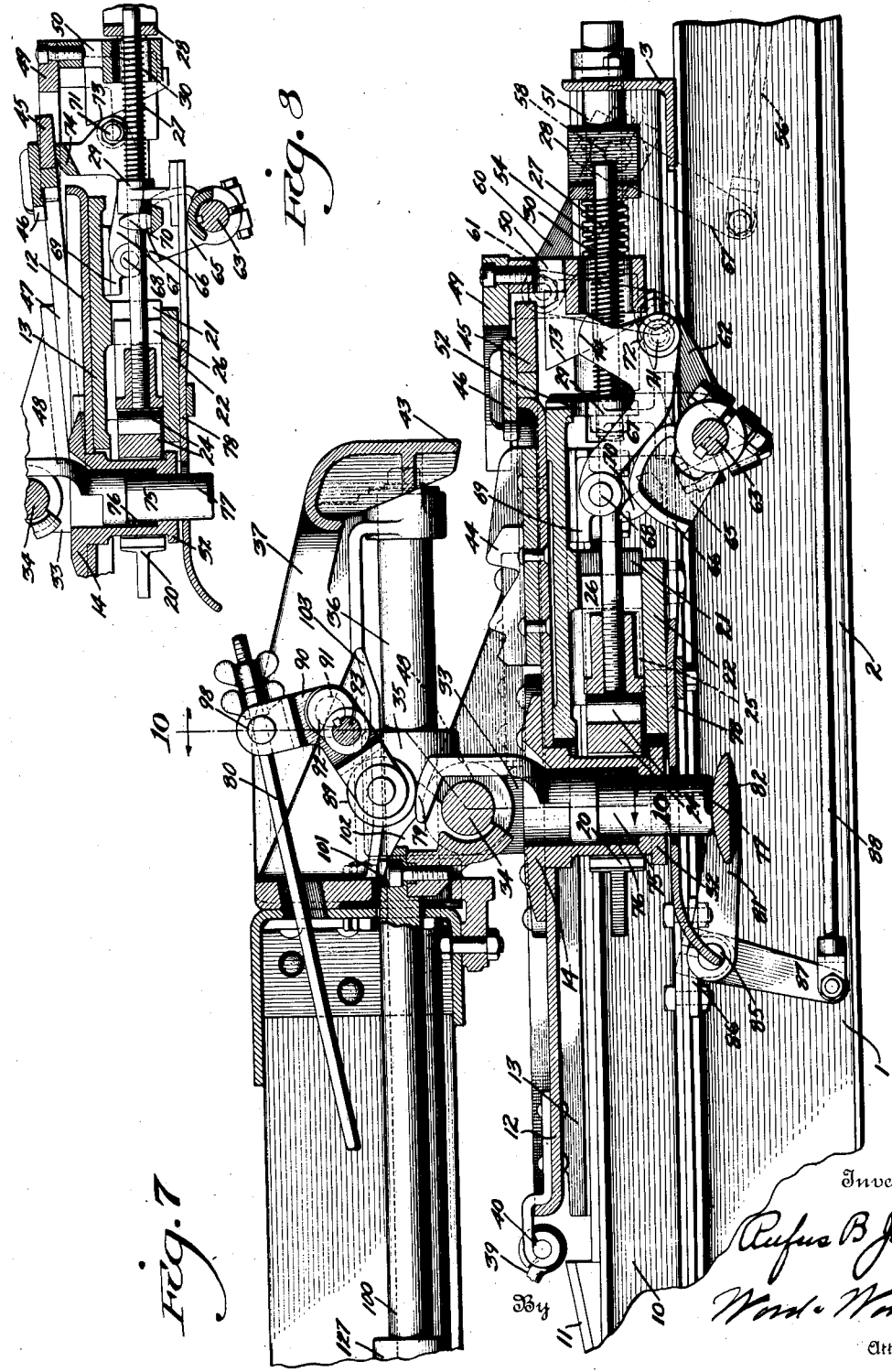

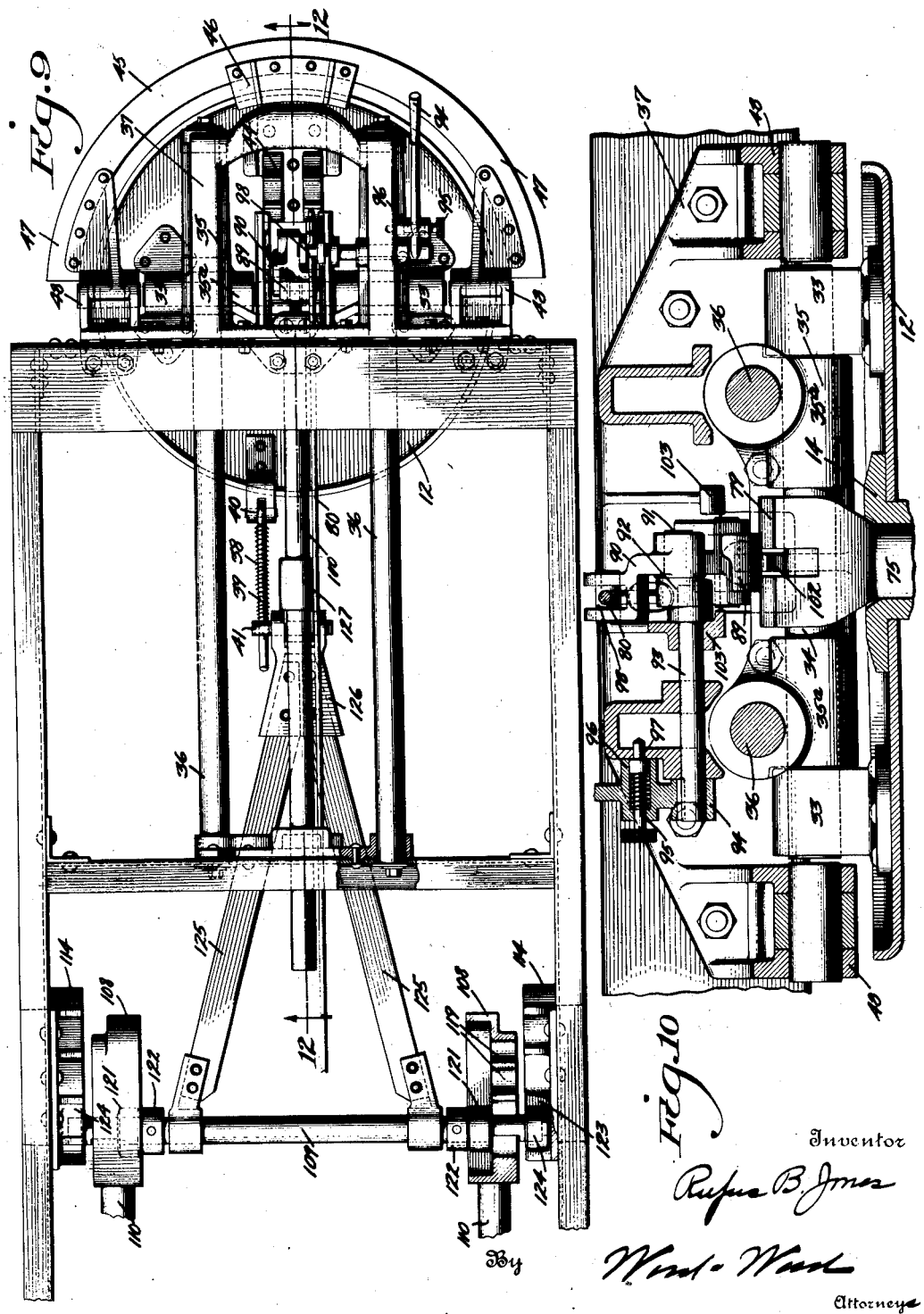

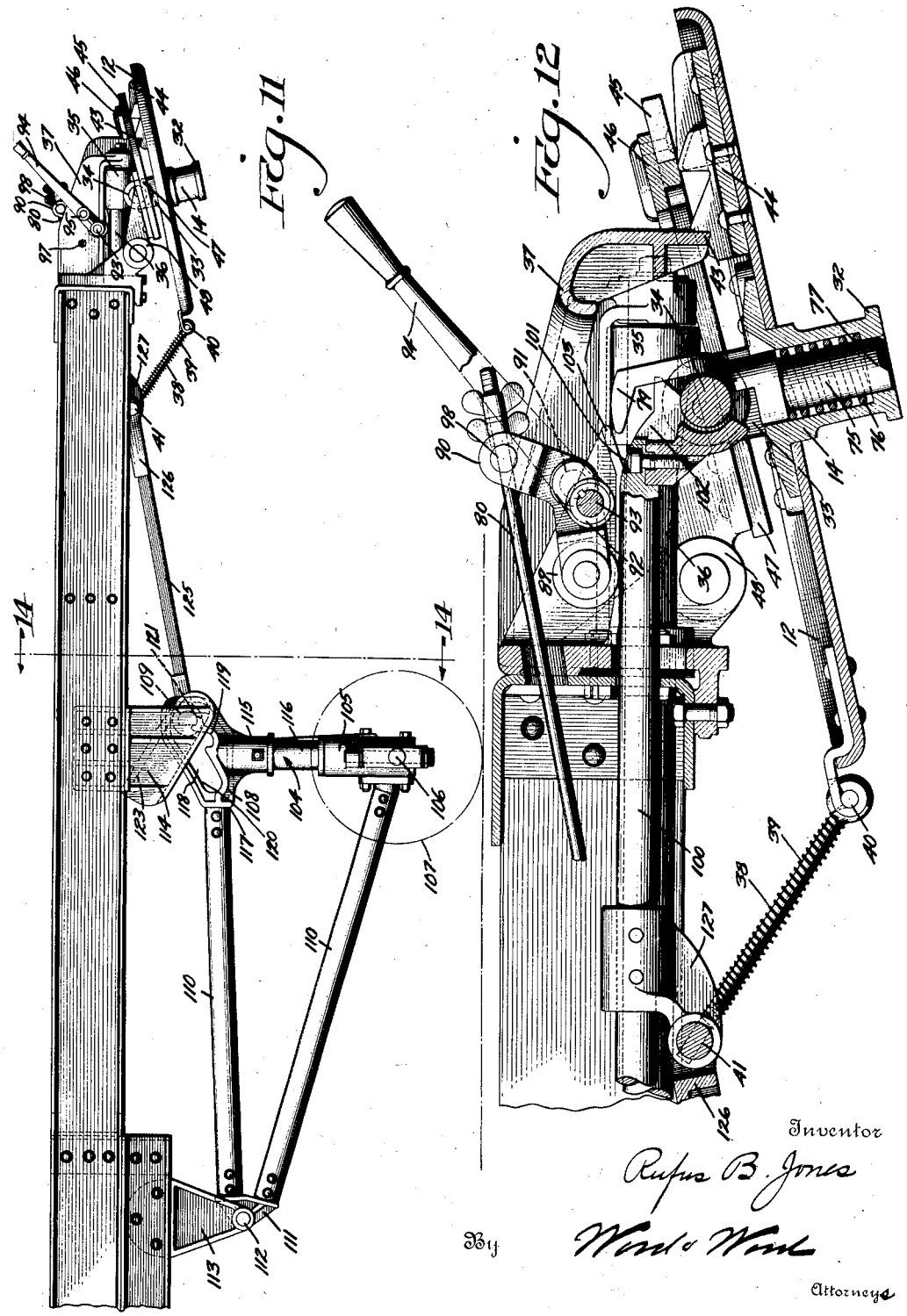

May 1, 1928.                                           1,668,276
R. B. JONES
TRACTOR TRAILER COMBINATION
Filed Oct. 30, 1925          7 Sheets-Sheet 6
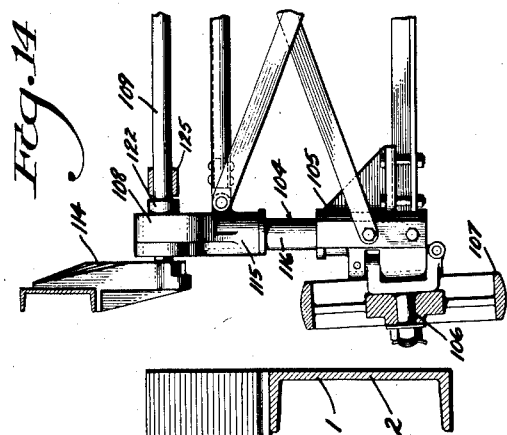
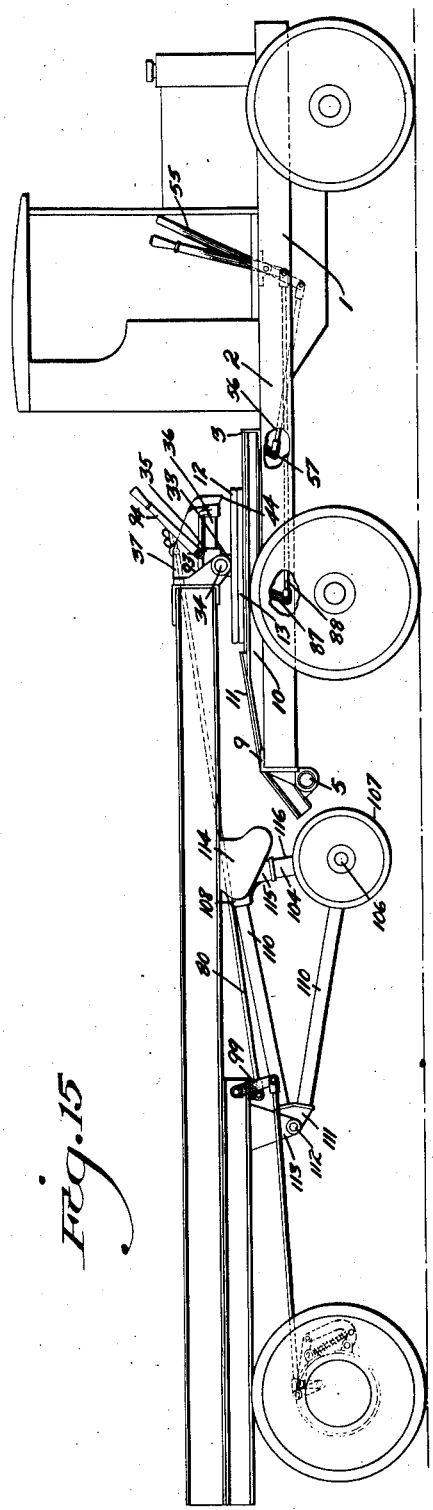
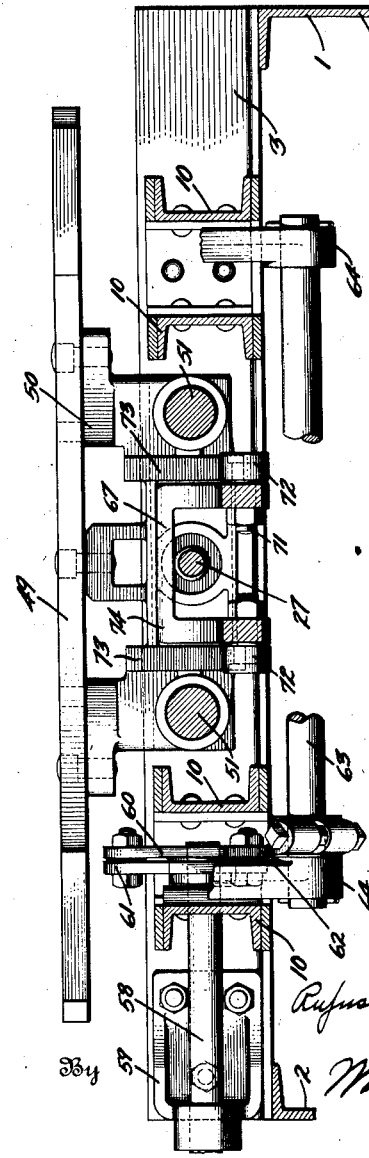
Inventor
Rufus B. Jones
By
Attorneys

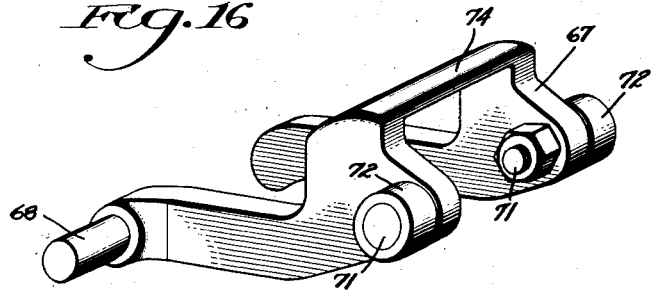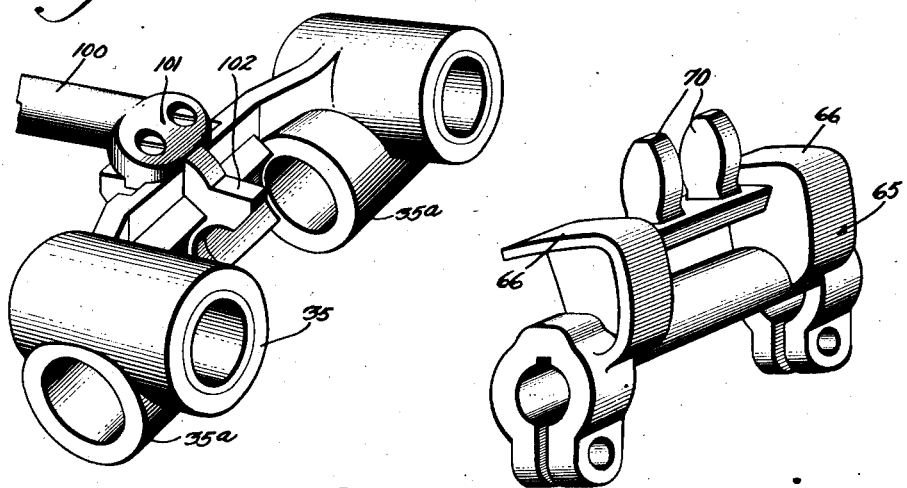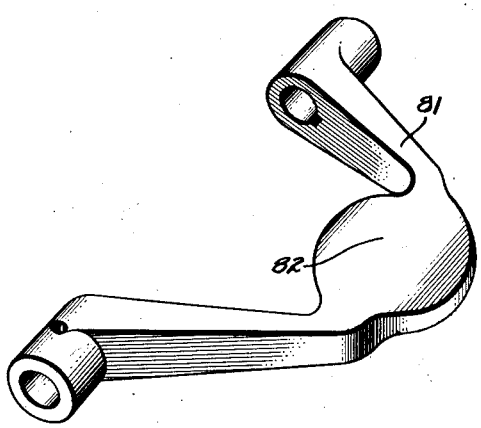

Patented May 1, 1928.

1,668,276

UNITED STATES PATENT OFFICE.

RUFUS B. JONES, OF CINCINNATI, OHIO, ASSIGNOR TO THE TRAILMOBILE COMPANY, OF CINCINNATI, OHIO, A CORPORATION OF OHIO.

TRACTOR-TRAILER COMBINATION.

Application filed October 30, 1925. Serial No. 65,891.

My invention relates to a semi-trailer and truck or tractor combination. The inventive concept herein disclosed pertains in part to the coupling operation, in part to the uncoupling, and in part to certain brake controls independent of the coupling or uncoupling, as when the trailer is being towed by the truck or when it stands parked, and it is desired to move the trailer from one position to another, and to an elevating control of a prop or jack which sustains the forward end of the trailer when the trailer is detached from the tractor.

The nature of the problem solved by this invention, as well as the general nature of the features and the performances of the several related groups of mechanisms, to be later described in detail, will be more readily understood from a somewhat general preamble disclosing the features in a broader aspect which is commensurate with the broader scope of the invention.

The semi-trailer has the usual set of rear ground wheels and when parked or detached from the tractor, has its forward end supported by a prop or jack of a wheeled type to render the trailer independently mobile. The chassis frame of the tractor at its rear end is provided with the usual incline or skid for elevating the front end of the trailer, thereby transferring a portion of the weight and load of the trailer upon the tractor and thereby giving to the wheels of the tractor the added weight for increased traction.

The automatic coupling is embodied in a true fifth-wheel combination, comprising a tractor and a trailer member, concentric king pin post and coupling jaws acting in the general principle of the automatic coupling of railway cars. The upper fifth wheel or trailer member has a hinged suspension from a carrier frame which is slidable on the forward end of the trailer, and when the trailer fifth-wheel is supported upon the tractor fifth-wheel there is established a swivel running gear or conventional vehicle fifth-wheel pivotal coupling between the tractor and trailer.

The upper fifth-wheel rocking suspension, provides a tilting action for cooperating with the incline skids of the tractor. Said rocking action further not only provides greater flexibility and facility in the coupling operations, but provides accommodation enabling the coupled tractor-trailer to assure different relative positions in service, or in coupling and uncoupling.

The tilting trailer fifth-wheel also provides for an automatic latching of the said upper fifth-wheel member and its supporting carrier against sliding motion upon the forward end of the trailer longitudinally of the trailer. This sliding action of the trailer fifth-wheel carrier, generated by coupling and uncoupling operations, is utilized by translation for operating the trailer brake mechanism, preferably to apply or set the brakes in advance of uncoupling, and to maintain the brakes set when the trailer is uncoupled and detached from the tractor. This action of said carrier is further utilized by translation, to raise and lower the props respectively in coupling and uncoupling operations.

The fifth-wheel members are of plate construction providing large bearing surfaces, enabling the use on the tractor, of broad lifting skids which are backed under the tilting upper plate. These broad area fifth-wheel plates and widely spaced tractor skids, have great practicability in providing wider range and greater facility for operating the tractor in its trailer engagement. This ability to couple at a considerable angle saves time and avoids maneuvering of the tractor to get it into workable alignment with the trailer.

It is desirable to automatically lift the props in relation to the trailer frame, which is effected by a translation of the slide movement of the upper fifth-wheel carrier frame, rearwardly during coupling for lifting, and forwardly during uncoupling for mechanically lowering the props.

Preferably also, the props are guided in relation to the trailer frame and automatically interlocked with the trailer frame under gravity influence in load supporting position.

Both tractor and trailer are provided with brake mechanism and controls which become operatively associated when the tractor-trailer unit is constituted.

Obviously this unitary relationship of the brake mechanism can best be secured through the employment of a connecting member passing through the axis of the two-part fifth-wheel, in a manner long known in the vehicle art, but in the present instance, the brake connecting member is additionally utilized as a lock bolt for an automatic coupling interlock.

The sliding fifth-wheel carrier on the trailer actuated by relative movements of tractor and trailer in coupling and uncoupling, may therefore, be regarded as a prime-mover controlling, through translating mechanism, the manipulation of the props and brakes, the brakes being released and the props raised in its rearward movement, or the push of the tractor, the props being lowered and the brakes set in its forward movement, or the pull of the tractor. These brake and prop manipulations are independent of the coupling and uncoupling operations proper. The coupling proper is automatically established prior to the rearward motion of the fifth-wheel carrier which effects the raising of the props and releasing of the brakes. The uncoupling proper is consummated only after the forward movement of the carrier under the pull of the tractor has set the brakes and lowered the props to supporting position.

A feature of this invention therefore comprises the means for translating the relative movement of the trailer fifth-wheel, preferably a sliding motion, into a prop manipulation and a trailer brake manipulation.

Great trouble has heretofore been experienced in a device of this general nature arising from the fact that there was a tendency of the truck and trailer to become uncoupled before the props had been surely brought into position for a ground support for the front end of the trailer.

It is one of the broader objects of this invention to overcome that difficulty, and in my device an important factor is that the uncoupling act cannot be consummated until the props have been definitely brought into their ground support position.

The coupling members for engaging the trailer fifth-wheel king pin are mounted on the truck fifth-wheel and preferably comprise pincer-like jaws adapted to be engaged and automatically closed by the king pin when the truck is backed, and a lock member which is automatically inserted between the front members of the pincer-like jaws, thus holding the coupling in a definite mechanical lock.

General operation.

When the trailer is parked the truck backs for coupling, the trailer fifth-wheel rides up the skid of the truck frame, the upper fifth-wheel inclining at a horizontal plane as it encounters the truck fifth-wheel and as it slides into registry therewith the king pin closes the coupling jaws and at the proper interval the lock member slides into a locked position with the coupling jaws. This initial coupling having been completed, the further backing action of the truck, slides as a unit the trailer fifth-wheel and bracket on the trailer frame, and this relative sliding of the trailer fifth-wheel to the frame operates two groups of mechanisms, one of which translates the motion to operate the prop or retract it from the ground and the other group of mechanisms is translated into a brake release. When this backing action has carried the trailer fifth-wheel to its rearmost position in relation to the frame, which is its draft position, it is automatically held in this place by a latch member pivoted to the trailer frame and which interlocks with the trailer fifth-wheel so that in the draft position and when the coupling is fully made and the brakes released, the trailer fifth-wheel is in a locked position, its rearward position in relation to the frame, and the truck and trailer have now been automatically constituted into a unitary vehicle.

This latch for automatically locking the trailer fifth-wheel to the frame is in the nature of a segment which is superposed over the trailer fifth-wheel and which becomes concentric thereto when the trailer fifth-wheel is in its draft position. To further insure this latching there is preferably an automatic locking means to hold the latch bracket in its engaged position, until released and during the draft.

In practice the provision preventing the ultimate uncoupling until the props are grounded, is highly advantageous. When the unit is constituted, the coupling, so far as draft and steering are concerned, is in the nature of a compound coupling of which the king pin is the center and the primary member, and of which the latch segment is the secondary member also concentric to the king pin.

Therefore in the coupling act, the brakes and the prop manipulations are wholly automatic and inhere in the relative backing movement of the truck and trailer and the relative movement of the trailer fifth-wheel to its frame, responsive to the tractor push.

The uncoupling and reversal of these prop and brake operations, is only semi-automatic, and they cannot be operated until certain interlock releases have been manually actuated by a controlling lever in the cab. That is to say, when it is desired to uncouple, a manual control lever is given an initial operation which releases the latch holding the trailer fifth-wheel to its frame and which raises the coupling interlock during the continued forward movement of the truck in relation to the trailer and while the two fifth-wheels are still in coupling relation with the king pin and coupling jaws interlocked.

The trailer fifth-wheel slides forward on its frame responsive to the tractor pull, during which motion the coupling control lever is interlocked against any further action until the trailer fifth-wheel have moved to its forward position on the frame. This forward sliding of the trailer fifth-wheel reverses the operation of the translating mechanism. That is, it lowers the props and sets the brakes while the truck and trailer are still in coupled relation, so that there is no danger of the front end of the trailer dropping to the ground while the props are not in supporting position. After the brakes have been set, and the props lowered, the interlock of the control lever is automatically removed from blocking position and a second manual movement of the control lever then performs the uncoupling act, so that the front end of the trailer, the wheels of which are braked, slides down the skid and the front end drops upon its supporting props as the truck continues its forward drive and becomes disassociated from the trailer.

While the invention in its broader sense resides in devices which embody these general characteristics it is obvious that separable groups of members comprise valuable subordinate inventions, for instance, certain inventions being peculiar to the coupling operation, to the prop operation, to the brake operation, to the interlocking features, and a very considerable phase of the invention concerns the relative movement of the trailer fifth-wheel to its frame and to automatically latching it in this draft position and manually releasing it in such manner that the truck cannot draw a trailer forward until the brakes are released and the props definitely raised, nor can the truck be uncoupled finally or definitely until the brakes are set and the props definitely lowered.

Other objects and certain advantages will be more fully set forth in the description of the accompanying drawings forming a part of this specification, in which:

Figure 1 is a side elevation of the rear of a truck or tractor chassis and the forward end of a trailer coupled to the tractor, the tractor containing inclined lifting skids and lower fifth wheel plate, and the trailer a rigid nose casting carrying an upper fifth wheel plate hingedly and slidably mounted. In this view a portion of the trailer is shown in section for illustrating the props which support the forward end of the trailer when the trailer is disconnected from the tractor.

Figure 2 is a top plan view of the trailer coupling structure carried by the rear end of the tractor, including the skids and lower fifth wheel plate, portions being broken away and others in section to illustrate parts which otherwise would be hidden.

Figure 3 is a section on line 3—3, of Fig. 2.

Figure 4 is a section on line 4—4, Fig. 2.

Figure 5 is a section on line 5—5, Fig. 2.

Figure 6 is an enlarged section on line 6—6, Fig. 2.

Figure 7 is an enlarged section on line 7—7, Fig. 2, including the coupling mechanism carried by the trailer.

Figure 8 is a sectional view similar to Fig. 7 as to the coupling mechanism showing a stage of operation.

Figure 9 is a top plan view of the coupling mechanism applied to or carried by the trailer.

Figure 10 is a section on line 10—10, Fig. 7.

Figure 11 is a side elevation of the forward end of the trailer illustrating the coupling mechanism and props.

Figure 12 is an enlarged section on line 12—12, Fig. 9.

Figure 13 is a section on line 13—13, Fig. 2.

Figure 14 is a section on line 14—14, Fig. 11.

Figure 15 is a diagrammatic side view of the trailer and tractor in coupled position.

Figure 16 is a perspective view of the ring lifter lever which controls the locking ring for the upper fifth-wheel member.

Figure 17 is a perspective view of the combined cam and crank arm, which operates the ring lifter lever and coupling plunger.

Figure 18 is a perspective view of the yoke which pivotally supports the upper fifth-wheel member and to which the jack raising push rod is connected.

Figure 19 is a perspective view of the brake spoon mounted upon the tractor.

The structure disclosed has been developed especially for heavy service and frequent coupling and uncoupling, so that the facilities are stability, quick action, full control from the driver's seat, for coupling and uncoupling and braking, mobility of trailer on its own wheels, and ability to couple at angles. Being of a semi-trailer type the front end of the trailer in the act of coupling and when coupled is elevated, automatically lifting the forward trailer wheels or props from the ground transferring a portion of the weight of the trailer and load to the driving wheels of the tractor, with the trailer swiveling upon the tractor for steering.

The tractor therefore is provided with stationary lifting skids terminating with a lower fifth wheel plate, and coupling jaws for engaging about a king pin depending from a fifth wheel plate, mounted upon the trailer. The skids track the upper fifth wheel plate of the trailer permitting the plate to slide thereon elevating the forward end of the trailer and guiding the upper fifth wheel plate upon the lower fifth wheel plate of the tractor.

Referring to the drawings, 1 indicates a tractor which may represent any commercial motor vehicle capable of sustaining upon the rear end of its chassis frame the coupling equipment for connecting the trailer to the tractor. The chassis frame usually is built up of structural steel as channel, and angle beams, and as illustrated comprises a pair of suitably spaced channel beams 2—2 for the longitudinal sides of the chassis frame. The side beams are connected by cross beams (see Figs. 2 to 5) as an angle iron beam 3 and sectional beam 4 and a bar tail beam 5. The angle beam 3 at its opposite ends is suitably bolted or riveted upon the top of the channel beam sides 2 and provides a forward support for coupling equipment carried by the tractor. The sectional cross beam 4 is composed of an intermediate channel 6 having hanger plates 7—7 adjustable or extensibly secured respectively at its opposite ends, engaged and fixed to the side beams 2—2 by U-bolts 8, and the tail cross bar 5 represents a rod bar with its opposite ends engaged and fixed in hanger brackets 9—9 fixed to the rear ends of the side beams 2.

The cross beams support a pair of suitably spaced girders, 10—10, built up of channel beams, with the rear portion of the girders from the cross beam 4 inclined downwardly and provided with top plates forming a pair of skids 11—11 for tracking and guiding an upper fifth wheel plate 12 carried upon the front end of the trailer for registration upon a lower stationary fifth-wheel plate 13 rigidly secured upon the girders at the end of the skids, as the tractor is backed under the upper fifth wheel plate for coupling. The skids lift the forward end of the trailer from the ground as the upper fifth wheel slides up the skids upon the lower plate.

The lower fifth wheel plate at its forward end has an opening of sector form, providing opposite angled guiding edges respectively extending from the inner edges of the skids to the axis of the plate for directing the king pin or tubular pintle 14 depending from the upper fifth wheel plate to its coupling position, and within coupling jaws mounted beneath the lower fifth wheel (see Figs. 2, 7 and 8).

The skids as guides for the king pin 14 provide a broad opening therebetween offering considerable latitude in aligning the tractor with the coupling pin. The operator need only be concerned in backing the tractor to bring the pin at any point between the skids, as the V-opening in the lower fifth plate reaching to the full distance spacing of the skids, guides the king pin to the center of the plate and between the coupling jaws. This feature together with the mounting and dimension of the upper fifth wheel plate permits angular coupling. The ability to couple at angles avoids maneuvering to position the tractor in exact alignment with the trailer. Coupling and uncoupling can be accomplished in limited spaces and congested places, and performed at angles of thirty to forty-five degrees. At even greater angles it is easy to back the tractor under the trailer sufficiently to lift the props off the ground and let the coupling jaws engage the king pin and lock in that position, after which the outfit can be moved to bring the tractor and trailer within an angle which would permit a complete raising of the props.

The lower fifth wheel plate is slidably mounted upon the guides to provide for buffer action to deaden the shock of the coupling force as the plate is engaged by the king pin 14 of the trailer. The movement is longitudinal of the tractor and trailer following a direction in which the vehicles are generally coupled and uncoupled. The buffer mechanism (see Figs. 2 and 6) comprises guide bars 15—15 respectively mounted within the guides, each bar having its opposite ends engaged within space blocks 16—16 fixed between the channel beams of a girder and each bar extends through a pair of spaced lugs 17 depending from the lower fifth wheel plate. A spring $17^a$ is interposed about the bar, between the opposite ends of a lug and spacer block, so that the fifth wheel plate is cushioned for its sliding motion in opposite directions. The lugs 17 are formed on the lower face of the fifth wheel plate 13 and are recessed as at 18, having the lubricator nipple 19 for lubricating the rods or bars 15. The upper side of the lower fifth wheel plate is provided with a slightly raised circular ridge providing a surface upon which the upper fifth wheel plate bears and swivels.

The king pin 14 depending from the upper fifth wheel plate is locked in coupling position by opposing coupling jaws 20—20 pivotally mounted to and beneath the lower fifth wheel plate. The lower fifth wheel plate is integrally provided with depending angle webs 21—21 to which a cross plate 22 is secured (see Figure 2). The coupling jaws each have oppositely extended trunnions 23 respectively journalled in the cross plate and fifth wheel plate. The jaws are the duplicate of each other and of a design for clasping about the king pin and to be actuated by the king pin for opening and closing when unlocked. Each jaw is provided with an outwardly flaring forward end for forcing the jaws to their full open position as the king pin is moved to transversely enter between the jaws, and laterally projected arm 24, the arm of one jaw overlying a corresponding arm of the second jaw, to be engaged by the king pin when the jaws are open for automatically closing the jaws.

For automatically locking the jaws in the closed position each jaw is provided with a lock arm 25 with a bearing face for engagement with the lock slide block on plunger 26 engaged between the opposing lock arms 25 of the jaws which confines the jaws against opening. The lock plunger 26 slidably bears upon the iron plate 22 and is connected to a stem or actuating rod 27 having its free end guidingly supported in a cross bar 28 appropriately secured to the chassis framing of the tractor. The actuating rod has a bracket member 29 fixed thereon which provides a shoulder for one end of a spring 30 about the rod, the opposite end of the spring engaging the rigid cross bar 28. The spring when the lock plunger is in a retracted position is under compression for forcibly moving the lock plunger forwardly between the jaws as soon as the jaws move to their closed position. The lock plunger is controlled or retracted manually by lever mechanism operated from the driver's seat, in the cab of the tractor.

As the clamping jaws are swung open the lock arms 25 of the jaws are moved inwardly toward each other in front of the lock block 26 to hold the lock block in its retracted position under the compression of the spring 30 so that the control mechanism can be released by the driver when the trailer has been uncoupled for positioning the parts for a recoupling. The coupling being primarily adaptable for a type of trailer having only a pair of rear ground wheels with the forward portion of the trailer when disengaged from the tractor being sustained by wheel props of a lifting or swinging type. Safety provisions are made for preventing a complete uncoupling until the props have been lowered to a degree at which they will sustain the forward end of the trailer.

The mechanical control of the parts prevents the driver from making a mistake for in uncoupling the jaws cannot be released until after the props have been drawn down. Lowering the props is a mechanical operation absolutely positive and performed by the pulling power of the truck itself. In coupling the king pin pushes against the jaws and closes them, and they lock shut before the props are raised, and with the jaws locked by the locking plunger or block the backing must be continued so that the power of the truck in backing, forces the props up, and raises them clear of the roadway. For uncoupling, interlocking mechanism is employed for controlling the release of the coupling jaws. A part of interlocking mechanism of the coupling mechanism is carried by the trailer which is also utilized for providing a connection of the trailer braking mechanism for control from the driver's seat to enable the operator to have a braking control of the trailer when the truck and trailer are coupled in running position.

The trailer carries the upper fifth wheel plate 12 pivotally mounted so as to swing to an inclined position for suitably tracking upon the inclined skids of the tractor. The upper fifth wheel plate represents a boiler steel plate of dished formation to provide a rounded guiding edge and axially has the hollow steel king pin 14 extending therefrom. The king pin has a flanged head which is riveted to the fifth wheel plate and an annular flange 32 at its lower end to check any tendency to lift out of the coupling jaws. A pair of bearing brackets 33—33 are rigidly fixed to the upper side of the fifth wheel plate 12 and suitably spaced apart for journaling the plate upon a horizontal cross rod 34, the cross rod being supported in a slide yoke or hanger 35, slidably engaged upon rods 36, mounted in the fifth wheel guide bracket 37 fixed to the front end of the trailer chassis frame. The sliding connection of the upper fifth wheel plate with the front end of the trailer permits relative longitudinal movement between the tractor and trailer when the fifth wheels and king pin are coupled for imparting the necessary motion under the mobile power of the tractor for raising or lowering the props and setting or releasing the brake mechanism of the trailer.

The brake mechanism of the trailer is thus set when the trailer is uncoupled, and normally maintained in its set condition during the period when the tractor and trailer are separated unless manually released, provision being made for such release. This secures or blocks the trailer against movement when standing alone and for holding the trailer so that the tractor may back under the trailer without the trailer moving away from the tractor. Through this longitudinal or reciprocating action of the upper fifth wheel member upon the fore end of the trailer the control of the interlock for the coupling jaws is obtained, so that the coupling jaws cannot be released until the trailer brake has been positively set and the props lowered or in condition to bear and sustain the weight of the forward end of the trailer. Initially for coupling it is necessary to lock the upper fifth wheel member against longitudinal movement upon the trailer or guide rods 36 and in its foremost position upon the guide rods, so that a final relative longitudinal motion may be obtained between the tractor and trailer, for the purpose heretofore mentioned.

The trailer fifth wheel member carrying the hollow king pin post, being hingedly suspended from the forward end of the trailer frame under the guide casting 37, is held normally and yieldably in the correct tilted position in relation to its medial hinge by spring and weight enabling the plate to engage and ride the inclined tractor skids. As this fifth wheel and its supporting slide frame are movable rearwardly on the tractor frame, this slide unit should be positively held against such rearward movement while the front end of the trailer is riding up the inclined skids of the tractor lest the force of the weighted trailer imposed on the inclined skids should move this unit rearwardly at this time and so prematurely operate the trailer props and brakes.

It is therefore essential to automatically latch the trailer fifth wheel normally and yieldably in its tilted position in such manner as to hold the slide unit against such rearward movement during the upward ride to the horizontal portion of the tractor platform, and preferably, to automatically release the latch when the fifth wheel assumes a horizontal position at a time prior to the actuation of the coupling jaws on the fifth wheel member of the tractor platform.

This can be variously accomplished, the example selected for illustration being shown in Figure 12, wherein the guide bracket casting 37 above the fifth wheel is formed at its front edge with a depending pawl or latch 43, operating as a stationary pawl in relation to the ratchet or interlock 44, which being on the front upper margin of the trailer fifth wheel is a movable component of the interlock.

At this point it should be fully understood that one of the novel and useful features, is that the push and pull energy of the tractor is utilized to slide the fifth wheel actuator unit on the trailer frame rearwardly and forwardly respectively directly through the coupled relation of the king pin and jaws, the positive engagement of the respective abutting services of the king pin and jaws transmitting the tractor power to energize the prop and brake actuator unit on the trailer.

The upper fifth wheel member in uncoupling is moved to its forward position upon the guide bracket 37 the movement being utilized to set the props and the brake, and when uncoupled and free from the tractor the upper fifth wheel member is swung to an inclined position by the spring 38 engaged about a guide rod 39. One end of the guide rod is pivotally connected at 40 to the upper fifth wheel member, and the opposite end of the slide rod moves through an aperture in a pin 41 as the axis for a flexible joint support journaled on the actuating rod 100 operating the props. The pin 41 is rotative to accommodate for the arc of movement of the spring guide rod 39 with the rock of the upper fifth wheel member. In the inclined position of the upper fifth wheel member its forward portion engages the nose end of the guide bracket 37 which is tooth shaped to serve as a dog 43 to engage with the toothed or notched rack 44 fixed on the forward upper side of the upper fifth member. When the parts are thus engaged as shown in Fig. 12, the upper fifth wheel is locked against rearward sliding motion particularly at the period when the tractor is being backed under the forward end of the trailer, with the upper fifth wheel plate sliding up the skids to lift the forward end of the trailer from the ground. After the fifth wheel has traversed over the brow of the skids sufficiently the weight of the trailer will cause the plate to swing to a horizontal plane releasing its engagement with the dog 43 whereupon the continued backing of the tractor results in the relative longitudinal movement between tractor and trailer for raising the props, releasing the brake and completing the coupling operation.

The forward portion of the upper fifth wheel plate after being coupled upon the lower fifth wheel plate is held against displacement by swinging a segmental rim plate 45 which engages upon the forward rim portion of the upper fifth wheel plate as shown in Fig. 7. The rim plate 45 is provided with a shoe 46 (see Fig. 9) rigidly secured thereto for engaging an intermediate portion of the fifth wheel plate and a pair of oppositely disposed arms 47—47 extending rearwardly and respectively fulcrumed to bracket arms 48—48 extending from the guide bracket 37 fixed to the forward end of the trailer. This rim plate is positively swung to a release position with the release control of the coupling jaws, and is hung to swing by gravity in a reverse or downward direction. When the trailer rim plate 45 is in its depressed position resting upon the fifth wheel plate it is locked by a curved shoe plate 49 fixed upon a slide frame 50 slidably mounted upon a pair of guide rods 51—51, the rods at one end being supported in the cross beam 3 and at the opposite ends in forwardly extended lugs 52—52 integral with and depending from the forward portion of the lower fifth wheel plate. The tractor guide frame 50 which carries curved shoe plate 49 is spring pressed to sustain the same in its normal position for engagement with the rim plate 45 by a pair of springs 54—54, respectively mounted about the guide rods 51—51. The curved shoe plate 49 is of an arc dimension to keep the parts locked against vertical displacement for the normal swing of the trailer upon the tractor while turning curves of the average roadway radius, therefore both rim plate on trailer and locking shoe plate on tractor have an arc formation concentric with the king pin axis in latched or draft position.

The coupling jaws and fifth wheel rim locking plate are actuated for releasing by a single or common controlling hand lever in the tractor cab and comprises, a hand lever 55 extending from the tractor chassis upwardly into the cab, (see Fig. 15) being suitably pivoted and having a connecting link 56 pivotally connected to its lower end. The connecting link extends rearward, and pivotally connects with a crank arm 57 fixed upon the end of a rock shaft 58 journaled in a bracket 59 bolted to the chassis cross beam or angle iron 3 and has a bearing in one of the channel irons of one of the girders 10 which the shaft traverses. (See Figs. 2 and 13.) A second crank arm 60 is fixed to the opposite end of the rock shaft 58, its free end is pivotally connected to a link 61, the link in turn is pivotally connected to the free end of a crank arm 62 fixed upon a rock shaft 63 beneath the girders 10—10 of the tractor chassis and journaled in bracket arms 64—64 integral with and depending from the forward portion of the lower fifth wheel plate 13. A combined cam and crank arm 65 is fixed upon the rock shaft 63, centrally thereof which actuates the coupling jaw locking plunger, the arc shaped lock plate and the upper fifth wheel locking ring.

As shown in Figures 2, 7, 8 and 13, the combined cam and crank arm is keyed upon the rock shaft 63 and is formed to provide a pair of oppositely disposed cams 66—66 for respectively engaging a pair of spaced arms, of a ring lifter lever 67, the arms at one end being pivotally mounted by means of laterally extending trunnions 68—68 integral with the arms and engaged in the bearings or hangers 69—69 dependingly secured to the lower surface of the lower fifth wheel plate 13. The cam and crank arm 65 has its arms or cam portions 66—66 connected by a cross bar 70 and preferably integral therewith for engaging with the bracket member 29 fixed upon the actuating rod 27 of the coupler plunger, the cross bar 70 being provided with a pair of rigidly extending teeth or lugs for straddling or yoking the actuating rod 27 and engaging with the sleeve portion of the bracket 29 through which the rod 27 extends. Thus when the combined cam and cross arm is rocked in a forward direction it will engage with the bracket 29 as shown in Figure 8, carrying the plunger actuating rod 27 therewith for withdrawing the plunger from its locking cooperation with the coupling jaws. The cam and crank arm also engage the lifting lever 67 swinging the same upwardly for disengaging the curved shoe plate 49 from the rim plate 45. The lifting lever is provided with a pair of oppositely extended trunnions 71—71 respectively carrying rollers 72 for engagement with the cams 73—73 extending from the guide bracket or bearing 50 for retracting the shoe plate 49 against the tension of the springs 54—54 for releasing the rim plate 45. Continued movement of the combined cam and crank arm raises the ring lifter 67 sufficiently to engage the bridge portion 74 with the rim plate to swing the same upwardly for releasing the upper fifth wheel plate as shown in Figure 8. A full stroke or swing of the cam and crank arm 65 for unlocking the coupling jaws and upper fifth wheel plate cannot be had unless the props of the trailer are down and the brakes set.

Because the cam and crank arm 65 is mounted on lower fifth wheel plate 13 through shaft 63, it has a slight horizontal fore and aft motion with respect to tractor in the direction of draft by compression of springs $17^a$. The parts between lever 62 on shaft 63 and cab control lever 55 are not subject to this motion fore and aft and therefore would operate control cam 65 simply by the fore and aft draft motion unless compensated for. This is the purpose of link 61 which lies normally in a vertical position and has its upper end pivotally connected to lever 60 not subject to horizontal draft spring motion and its lower end pivotally connected to lever 62 subject to horizontal draft spring motion. As the lower end of link 61 moves horizontally fore and aft by compression of springs $17^a$ due to draft, it does not have any appreciable vertical motion because of the proportion of length of link to amount of horizontal motion. It will be seen that the rotation of lever is accomplished by the vertical thrust of link 61 so that the horizontal motion does not rotate cam 65 thus allowing control to be unaffected by draft motion of fifth wheel with respect to tractor and control lever 55.

An interlock is provided and this interlock cannot be moved until after the preliminary uncoupling operations have been made so that the operator cannot through any over-sight let the front end of the trailer fall to the ground in uncoupling, for in uncoupling the jaws cannot be released until after the props have been drawn down and the brakes set, this being accomplished by the limited movement of the upper fifth wheel upon the guide rods 36 which will release a brake plunger 75 concentrically extending through the king pin of the upper fifth wheel plate, the plunger also providing an intermediate coupling between the brake mechanism of the trailer and the controlling mechanism therefor on the tractor. The brake plunger 75 engages against a coil spring 76 seated in the bore of the king pin as shown in Figure 8 for automatically moving the plunger upwardly when released from the brake mechanism carried by the trailer, so that its stem end 77 will be moved into the king pin and released from engagement with a lock plate 78, the stem end of the brake plunger 75 traversing or engaging through an aperture in an interlock plate 78 when the parts are coupled. The interlock plate is slidably supported under the cross plate 22 beneath the coupling jaws and is fixed to the base of the bracket member 29. It will be therefore observed that as long as the brake plunger is engaged through the interlock plate, that the plate cannot be moved or slid and this secures or locks the coupler lock plunger against actuation, being connected with the interlock plate, by the bracket member 29. The interlock plate thus provides a safety feature making it necessary in uncoupling for a lowering of the props and a setting of the brakes in advance to release the coupling jaws and this control or safety interlock prevents the control member from being pulled back beyond that of the first step which is sufficient to release the rim plate from engagement with the forward portion of the upper fifth wheel member to permit the independent movement between tractor and trailer or sliding action of the upper fifth wheel upon a forward end of the trailer. The rim plate 45 locking the upper fifth wheel plate against sliding motion upon the rods 36 is pivoted to the stationary bearing bracket 37 of the trailer. The rim plate 45 is pivoted directly upon the guide bracket 37, and does not move independently longitudinal of the trailer and therefore when engaged over the forward portion of the upper fifth wheel locks the fifth wheel against movement upon the guide bracket.

The interlock plate 78 has its rear or free end bent or flared downwardly to direct the brake plunger upwardly and not to offer any interference in coupling, and the lower edge of the brake plunger is rounded so that it will depress the interlock plate slightly for extracting the plunger from the aperture in the interlock plate in uncoupling should the plunger in its released position extend slightly beyond the head plane of the king pin.

The upper end of the brake plunger 75 (see Fig. 7), is notched to clear the cross rod 34 carrying the upper fifth wheel plate, and provide an arc shaped head 79 extending rearwardly over the cross rod 34 and beyond the axis of the plunger permitting of a more central contact of the plunger with a brake operating lever 90 supported upon the guide bearing or bracket 37 for establishing more freedom of movement to the operation of the brake plunger which provides the coupling link between the brake operating mechanism carried by the trailer and that of the tractor for manual service or emergency brake control from the tractor cab when the vehicles are coupled. The brake connection with a hand lever in the cab of the tractor carried by the tractor comprises a brake spoon or yoke lever 81 provided with a central knob portion 82 which contacts with the base end of the brake plunger 75. The spoon 81 has one of its arms fixed to a shaft 83 journaled in a bracket bearing 84 bolted to the under side of one of the girders, and its second arm is fixed to a rock shaft 85 journaled in bracket bearings 86—86 fixed to the under side of the opposite girder. The rock shaft 85 extends beyond the outer bearing and carries a crank arm 87 dependingly, the crank arm in turn pivotally connected to one end of a connecting rod 88, with the opposite end of the connecting rod pivotally connected to a hand lever in the cab of the tractor. The head of the brake plunger when the tractor and trailer are coupled contacts with a roller 89 journaled in one end of a bell crank lever 90. The bell crank lever 90 is pivotally supported upon a pintle stud 91 of a brake release eccentric 92 fixed on one end of a rock shaft 93 (see Fig. 10) suitably journaled in the guide bearing or nose bracket 37 on the front end of the trailer. The opposite or outer end of the rock shaft 93 is provided with a brake release lever 94, the lever keyed on the end of the shaft, and provided with a spring pressed detent 95 engaged within the bore of a boss 96 formed on said lever. The detent is arranged to engage into aperture 97 in one side of a projecting wall of the guide bearing or bracket 37 for locking the lever 93 and brake release eccentric 92 in their adjusted position. The bell crank lever 90 at its opposite end is of fork formation for supporting and journalling a pintle stud 98 which is apertured to receive the brake connecting rod 80 therethrough. The swivel connection between the brake rod 80 and bell crank lever 90 accommodates for the relative different arcs of motion of said members, as the rod is actuated by the bell crank lever. The brake rod 80 pivotally connects to a rock shaft 99 suitably journaled in the trailer chassis, serving to distribute the brake controlling motion simultaneously to brake for each of the rear wheels. The brakes are not shown in detail as they may represent any conventional form adapted to be set or released by the reciprocal motion of the brake connecting rod 80.

When the tractor and trailer are coupled in the running position the hand lever in the cab provides for the brake service and emergency control, the motion being transmitted positively to the brake for setting the brake, while the release motion for some of the parts is through retreating spring pressure.

Thus when the hand brake in the cab is moved in an appropriate direction for applying or setting the brake, the brake spoon 81 is rocked or swung upwardly, raising the brake plunger 75 within the king pin of the upper fifth wheel plate, thereby actuating the bell crank lever 90 which is normally sustained in definite pivoted position by the release eccentric 92, the bell crank lever 90 in turn transmitting motion to the brake connecting rod 80, continuing to the brake. For a retreat motion the brakes usually are provided with release springs which are capable of exerting sufficient force to offset the tension of the spring 76 for the brake plunger 75 after the brake spoon 81 has been depressed by the hand lever in the cab.

As the coupling of the trailer and tractor is automatic by backing the tractor under the upper fifth wheel of the trailer, the trailer must be blocked against movement under the backing force of the tractor and also against the pulling force of the tractor in uncoupling, and also to hold the trailer when uncoupled, or parked. This blocking is accomplished through trailer brakes when set which are of sufficient capacity to meet the demands, and under automatic positive control in coupling and uncoupling through the relative longitudinal movement of the tractor and trailer or the sliding or reciprocating motion of the upper fifth wheel upon the fore part of the trailer, this motion being utilized for setting and releasing the brakes. In coupling the brakes are released after the coupling jaws of the lower fifth wheel plate have engaged the king pin of the upper plate. The locking plunger immediately after the jaws are closed slips into position and holds the coupling jaws closed, so that a release of the brake is a final operation. It is recognized, however, that the action is very quick in a continuous backing movement of the tractor. For uncoupling, the first portion of the forward motion of the tractor firmly sets the brakes, and by reason of the interlock, previously described, the brake setting operation as well as the lowering of the props must precede the opening of the coupling jaws to release the king pin.

The upper fifth wheel carrying slide yoke 35 has the forward end of a prop and brake actuating or jack push rod 100 fixed thereto, (see Fig. 12), the end of the actuating rod 100 being secured centrally of the yoke 35 and the cross bar portion thereof connecting the bearings 35ᵃ—35ᵃ.

The forward end of the jack push rod 100 has its upper side rounded as at 101 and continues with the cam lug 102 integral with the cross bar portion of the slide yoke 35 providing an inclined way upon which the roller 89 on the end of the bell crank lever 90 travels when the slide yoke 35 is reciprocated upon the guide rods 36—36 for positively actuating or setting and alternately releasing the brakes. As shown in Figure 12, the slide yoke is in its foremost position with the bell crank lever 90 engaged upon the rod 100 for maintaining the brakes in a set condition. When the slide yoke 35 is moved to its rearmost position as shown in Fig. 7, the bell crank lever 90 will be clear of the cam lug 102 permitting the bell crank lever 90 to have its connection transferred upon the head of the brake plunger 75, the brakes, normally when the bell crank lever 90 is engaged upon the head of the brake plunger 75 are released unless under the braking control of the brake lever in the cab of the tractor. As shown, the head portion of the brake plunger 75 is notched or bifurcated to provide a clearance for the nose end of the brake operating cam lug 102. When the slide yoke 35 is in its foremost position, the brakes of the trailer are set and so maintained through the engagement of the bell crank lever 90 upon the jack push rod 100 and in such position of the parts the brake plunger 75 is fully released which is necessary to allow its base end to be disengaged from the interlock plate 78, the brake plunger being pushed upwardly by the force of the spring 76. This brings the head of the brake plunger slightly above the point where it could be appropriately engaged by the roller of the bell crank lever 90. The brake plunger 75 in the rearward motion of the slide yoke engages a pair of oppositely disposed guide shoes 103—103 as spaced arms formed integral with the guide bearing 37 and extending from the rear wall portion of said bearing for depressing the brake plunger 75 to bring its upper surface in a plane to be easily engaged by the roller 89 of the bell crank lever 90 and depressed thereby under the released pressure of the brakes. One of the guide shoes 103 also provides a support and bearing for one end of the rock shaft 93 carrying the brake release eccentric 92. These guide shoes 103 also provide a timing control for the release of the brake plunger 75 during a portion of the independent movement of the upper fifth wheel and its slide yoke in the prop and brake controlling interval so that the brake plunger is not fully released and disengaged from the interlock plate 78 before the trailer brakes have been appropriately set and the props lowered in an uncoupling operation, and for obtaining such results the guide shoes 103 are of sufficient length to prevent a full release of the brake plunger 75 until the roller 89 of the bell crank lever 90 has been thrown to its full brake setting position in riding up the incline at the forward end of the jack push rod 100. The forward end of the trailer has a wheeled prop to support the trailer when parked alone or uncoupled from the tractor, the wheel type of prop enabling the trailer to be moved about without coupling the tractor under it. While the brakes are automatically set by the action of uncoupling, they however can be manually released by the brake release lever 94. By releasing the detent lock for the brake release lever 94 the lever can be swung in an appropriate direction which will swing the eccentric 92 thereby swinging and moving the bell crank lever 90 rearwardly which action will release the brakes. The brake release lever 94 must be reset to its normal position resetting the brakes before an automatic brake control can be effected in coupling the tractor and trailer.

The props in the present instance represent a swinging frame structure to provide for additional and independent elevation for obtaining an extending ground or roadway clearance when the trailer is coupled beyond that produced by the elevating of the forward end of the trailer in moving up the skids. The prop frame structure is principally formed of tubing connected by suitable fittings, which however for the present purposes need not be described in detail as the same may present any type of frame structure having the stability to sustain the load for the capacity of the trailer. In general it comprises a leg or jack frame 104 consisting of end posts connected by cross bars, the lower end of each post having a fitting 105 fixed thereto for pivotally mounting a stud axle 106 carrying a wheel 107. The upper end of each post has a cam fitting 108 fixed thereon through which a shifting cross rod 109 is engaged. The post end fittings 105 and 108 have fixed thereto side frames or radius bars 110—110 and connected at the rear end by a fitting 111 pivotally mounted upon a cross bar 112 supported in depending hanger bearings 113 fixed upon the underside of the chassis side beams. The leg or jack frame 104 and side frames or radius bars 110—110 constitute as a unit a swinging wheeled prop or jack. The cam fittings 108 at opposite sides of the forward upper end of the jack or prop, are the duplicate of each other except for being right and left, and in the plural number offer greater stability and ease of operation and therefore the prop hangs from the trailer chassis in a balance condition. The detail structure for one side is the duplicate of that for the other side so that the parts need only be described in the singular as to their form of construction. The cam fittings 108 may be referred to as a movable prop cam, which cooperate with the movable cross rod 109 and stationary cams 114—114 fixed to and depending respectively from the opposite side or longitudinal beams of the trailer chassis. A stationary cam 114 is adjacent to a relative movable cam 108 of the prop. Each movable cam 108 comprises a body portion having a hub extension 115 into which a section of tubing or bar material is secured to provide a post 116, and the hub has suitable lugs and ears integral therewith for making the cross bar connections for building up the unit prop structure. Likewise the body portion of the cam 108 has a lug extension 117 integral therewith to which the end of the upper radius bar or tube is attached.

The body portion of the movable cam 108 has an opening 118 therethrough through which the cross rod 109 extends, to engage into a cam groove of the stationary cam 114 which is located adjacent the outer side of the movable cam, and also for engagement into one of a plural number of notches 119 as ratchet notches in the lower edge surface forming the means for locking the prop in a set position when sustaining the weight of the forward end of the trailer. The upper edge surface of the opening is inclined corresponding to a laterally extending flange 120 on the inner side of the body portion, which is engaged by a roller 121 journaled upon the cross rod 109 held against displacement by a collar 122 fixed on the rod 109 (see Fig. 9). The flange merely provides an increased track surface for the roller, and with the opening may be treated as a cam opening transversely or at an angle to the cam groove 123 formed in the stationary cam 114, into which one end of the cross rod 109 engages. The end of the rod has a roller 124 journaled thereto. The two cams cooperate in conjunction with the cross rod when the rod is moved in a direction longitudinal of the trailer for elevating or lowering the prop. The cross rod is connected to relatively converging pull rods 125—125 rigidly connected at the forward ends by a coupling yoke 126 which is pivotally connected to the push rod link bearing 127 fixed upon the push rod 100 connected to and fixed to the sliding yoke of the upper fifth wheel.

Thus when the push rod 100 is shifted or moved forwardly it will correspondingly draw the cross rod 109 which by reason of the stationary cam will be deflected downwardly, lowering the prop, and at the limit of a full stroke bring the cross shaft into registry with the first locking notch 119 of the movable cam 108 to be engaged therein, after the forward end of the trailer has been sufficiently lowered for the prop to take the weight of the forward end of the trailer. The cam opening at the notches is of an area to provide slight descent action of the trailer with the props resting upon the roadway, until the cross rod seats into the notch or recess confining the parts, augmented by the weight of the trailer and its load against displacement, under any collapsing influence or draft motion of the trailer.

The relative cross arrangement of the movable and stationary cams functions to compound the elevation motion or swing of the props proportionately to a determined drawing motion of the cross rod, so that the relative motion of the trailer and upper fifth wheel or tractor can be reduced to a minimum.

Having described my invention, I claim:
1. In a tractor-trailer combination, a tractor having a lower fifth-wheel member, an inclined plane leading to the lower fifth-wheel member, a trailer having a hingedly mounted upper fifth-wheel member, adapted to ascend said inclined plane to bring the upper fifth-wheel into swivel bearing engagement with the lower fifth-wheel member, coupler mechanism for coupling said fifth-wheel member for a draft connection, and a latch member having a concentric bearing engagement with said fifth-wheel assembly for sustaining said fifth-wheel against displacement.

2. In a tractor-trailer combination, a tractor having a lower fifth-wheel member, a a trailer having an upper fifth-wheel member, having swivel bearing engagement with the lower fifth-wheel member, coupler mechanism for coupling said fifth-wheel members for a draft connection, and a latch member having a peripheral engagement with said upper fifth-wheel member for sustaining said fifth-wheel member against displacement axially.

3. In a tractor-trailer combination having a separable fifth-wheel and king pin coupling, a tractor carrying a lower fifth-wheel member, a trailer, at its forward end hingedly carrying an upper fifth-wheel member with an axially depending king pin, the upper fifth-wheel having a swivel bearing engagement upon the lower fifth-wheel member when the coupling has been established, coupling mechanism mounted below the lower fifth-wheel cooperating with said king pin for maintaining a swivel and draft connection of said fifth-wheel members, and a latch member carried by the trailer having a peripheral engagement with said upper fifth-wheel member for sustaining said fifth-wheel members against displacement.

4. In a tractor-trailer combination having a separable fifth-wheel and king pin coupling, a tractor carrying a lower fifth-wheel member, spaced inclined planes on said tractor leading to the lower fifth-wheel member, a trailer, at its forward end hingedly carrying an upper fifth-wheel member with an axially depending king pin, the upper fifth-wheel in coupling the vehicles being adapted to ascend said inclined planes to bring the same into swivel bearing engagement with the lower fifth-wheel member, said lower fifth-wheel member notched to provide an axial socket for the king pin and diverging guide walls to the inner longitudinal edges of the inclined planes for establishing an automatic coupling and uncoupling in a relative draft line motion of said vehicles, coupler mechanism mounted below the lower fifth-wheel cooperating with said king pin for maintaining a swivel and draft connection of said fifth-wheel members, and a latch member carried by the trailer having a rim engagement with said upper fifth-wheel member for sustaining said fifth-wheel members against displacement axially and non-interfering to the swivel motion of said members.

5. In a vehicle combining a tractor and trailer for unit service and detachable for independent service, the trailer supported at its forward end upon the rear end of the tractor, a fifth-wheel coupling providing a swivel connection for said tractor and trailer, comprising a fifth-wheel member on said tractor and a fifth-wheel member on said trailer, said trailer fifth-wheel member mounted upon the trailer for relative movement of the trailer and fifth-wheel member longitudinally of the trailer, and a lock member hingedly mounted upon the trailer concentrically engaging the fifth-wheel assembly for locking the parts against said relative movement in the line of draft.

6. In a vehicle combining a tractor and trailer for unit service and detachable for independent service, the trailer supported at its forward end upon the rear end of the tractor, a fifth-wheel coupling providing a swivel connection for said tractor and trailer, comprising a fifth-wheel member on said tractor and a fifth-wheel member on said trailer, said trailer fifth-wheel member mounted upon the trailer in the line of vehicle draft, a lock member hingedly mounted upon the trailer concentrically engaging the fifth-wheel assembly for locking the parts against said relative movement, and means for manipulating said lock member.

7. In a vehicle combining a tractor, and trailer for unit service and detachable for independent service, a trailer supported at its forward end upon the rear end of the tractor, a fifth-wheel coupling providing a swivel connection for said tractor and trailer, comprising a fifth-wheel member slidably movable on and longitudinally of said trailer, springs arranged to resist movement of said fifth-wheel member in opposite directions, and a fifth-wheel member on said tractor, and a lock member hingedly mounted upon the trailer concentrically engaging the fifth-wheel assembly for locking the parts against said relative movement.

8. In a vehicle combining a tractor and trailer for unit service and detachable for independent service, a trailer supported at its forward end upon the rear end of the tractor, a fifth-wheel coupling providing a swivel connection for said tractor and trailer, comprising a fifth-wheel member on said tractor and a fifth-wheel member on said trailer, having an axial king pin extension, said trailer fifth-wheel member mounted upon the trailer for relative movement of the trailer and fifth-wheel member longitudinally of the trailer, coupler mechanism on the tractor for engagement with the king pin of the upper fifth-wheel, coupler locking and control mechanism, an interlock member for said coupler locking and control mechanism, a plunger member coaxial with said king pin extension, adapted to engage with said interlock member, controlled by said relative movement of the upper fifth-wheel member and trailer.

9. In a vehicle combining a tractor and trailer for unit service and detachable for independent service, the trailer supported at its forward end upon the rear end of the tractor, a fifth-wheel coupling providing a swivel connection for said tractor and trailer separable in a vehicle draft direction for coupling and uncoupling, one member thereof mounted upon the trailer for relative movement of the trailer and member longitudinally of the trailer, and provided with a king pin, automatic coupler mechanism carried by the tractor cooperating with the king pin for establishing a draft connection of said fifth-wheel members, locking and controlling means for said coupler mechanism, and a translating interlock member for restraining the control of said locking and controlling means controlled through the relative movement of said fifth-wheel member and trailer.

10. In a tractor trailer adapted for automatic coupling, trailer brakes and props to be raised and lowered, a tractor fifth-wheel plate and a coupling member, a trailer coupling member and a fifth-wheel plate operatively connected to said brakes and props, the fifth-wheel assembly when coupled being movable in the line of draft in relation to the trailer frame, a latch for said fifth-wheel assembly in the rear or draft position, and means confining the coupling and uncoupling acts to the forward position of said fifth-wheel assembly.

11. In a vehicle combining a tractor and trailer for unit service and detachable for independent service, the trailer supported at its forward end upon the rear end of the tractor, a fifth-wheel coupling providing a swivel connection for said tractor and trailer comprising an upper member and a lower member separable in a vehicle draft direction for coupling and uncoupling, the upper member thereof mounted upon the trailer for relative movement of the trailer and member longitudinally of the trailer, and provided with a king pin, automatic coupler mechanism carried by the lower fifth-wheel member cooperating with the king pin for establishing a draft connection of said fifth-wheel members, locking and controlling means for said coupler mechanism, a translating interlock member for restraining the control of said locking and controlling means controlled through the relative movement of said fifth-wheel member and trailer, and a lock member mounted upon said trailer engaging said upper fifth-wheel member for securing the same against said relative movement, and manually operated control means for releasing said lock member and coupler controlling means.

12. In a vehicle combining a tractor and trailer for unit service and detachable for independent service, the trailer supported at its forward end upon the rear end of the tractor, a fifth-wheel coupling providing a swivel connection for said tractor and trailer comprising an upper member and a lower member separable in a vehicle draft direction for coupling and uncoupling, the upper member thereof mounted upon the trailer for relative movement of the trailer and member longitudinally of the trailer, and provided with a king pin, automatic coupler mechanism carried by the lower fifth-wheel member cooperating with the king pin for establishing a draft connection of said fifth-wheel members, locking and controlling means for said coupler mechanism, a translating interlock member for restraining the control of said locking and controlling means controlled through the relative movement of said fifth-wheel member and trailer, a lock member mounted upon said trailer engaging said upper fifth-wheel member for securing the same against said relative movement, and a latch member having a rim engagement with said upper fifth-wheel member for sustaining said member against axial displacement, and manually operated control means for releasing said coupler controlling means, lock member, and latch member.

13. In a vehicle combining a tractor and trailer for unit service and detachable for independent service, the trailer supported at its forward end upon the rear end of the tractor, a fifth-wheel coupling providing a swivel connection for said tractor and trailer comprising an upper member and a lower member separable in a vehicle draft direction for coupling and uncoupling, and provided with a king pin, automatic coupler mechanism carried by the lower fifth-wheel member cooperating with the king pin for establishing a draft connection of said fifth-wheel members, locking and controlling means for said coupler mechanism, a latch member having a rim engagement with said upper fifth-wheel member when coupled for sustaining said member against axial displacement, and a hand lever operated control means for releasing coupler mechanism and latch member.

14. In a vehicle combining a tractor and trailer for unit service and detachable for independent service, the trailer supported at its forward end upon the rear end of the tractor, a fifth-wheel coupling providing a swivel connection for said tractor and trailer comprising an upper member and a lower member separable in a vehicle draft direction for coupling and uncoupling, the upper member thereof mounted upon the trailer for relative movement of the trailer and member longitudinally of the trailer, and provided with a king pin, automatic coupler mechanism carried by the lower fifth-wheel member cooperating with the king pin for establishing a draft connection of said fifth-wheel members, locking and controlling means for said coupler mechanism, a translating interlock member for restraining the control of said locking and controlling means controlled through the relative movement of said fifth-wheel member and trailer, and a lock member mounted upon said trailer engaging said upper fifth-wheel member for securing the same against said relative movement, a latch member having a rim engagement with said upper fifth-wheel member when coupled for sustaining said member against axial displacement, and a hand lever operated control means for releasing said latch and lock member and said coupler controlling means free from said interlock member.

15. In a vehicle combining a tractor and trailer for unit service and detachable for independent service, a trailer supported at its forward end upon the rear end of the tractor, a swinging support for the forward end of the trailer when trailer is detached, said support adapted to be actuated by the tractor to move said support into a non-supporting position when connecting the tractor to the trailer, a fifth-wheel coupling providing a swivel connection for said tractor and trailer, comprising separable upper and lower members, the upper member mounted upon the trailer for relative movement of the trailer and fifth-wheel member longitudinally of the trailer, and connected with said swinging support, coupler mechanism on the tractor for establishing a draft connection of said fifth-wheel members, coupler locking and control mechanism, a lock member mounted upon the trailer for securing said upper fifth-wheel member against said relative movement, and means for releasing said lock member.

16. In a vehicle combining a tractor and trailer for unit service and detachable for independent service, a trailer supported at its forward end upon the rear end of the tractor, a movable support for the forward end of the trailer when the trailer is detached, said support adapted to be actuated by the tractor to move said support into a non-supporting position when connecting the tractor to the trailer, a separable fifth-wheel coupling providing a swivel connection for said tractor and trailer, one member of the fifth-wheel being mounted upon the trailer for relative reciprocal movement of trailer and tractor when the coupling is established for positively moving said support in either supporting or non-supporting positions and controllable means for locking said member against reciprocal movement.

17. In a vehicle combining a tractor and trailer for unit service and detachable for independent service, a trailer supported at its forward end upon the rear end of the tractor, a support for the forward end of the trailer when the trailer is detached, movable to a non-supporting position, a separable fifth-wheel coupling connection for said tractor and trailer, slidably mounted for relative movement of the trailer and tractor when the coupling is established and connected with said support for positively moving said support to either trailer supporting or non-supporting position, and control means for coupling said tractor and trailer.

18. In a vehicle combining a tractor and trailer for unit service and detachable for independent service, a trailer supported at its forward end upon the rear end of the tractor, a pivoted prop for supporting the forward end of the trailer when the trailer is detached, a separable fifth-wheel coupling connection for said tractor and trailer, slidably mounted for relative movement of the trailer and tractor when coupled, a pivoted actuator link connecting with said fifth-wheel and having a floating pivotal connection with the prop intermediate the prop and link fulcrums for a toggle organization, for shifting the prop with the motion of the fifth-wheel imparted by the said relative movement of tractor and trailer, and locking means at the union of said link and prop for lockingly sustaining said connected parts against a toggle motion and under the weight of the trailer.

19. In a vehicle combining a tractor and trailer for unit service and detachable for independent service, a trailer supported at its forward end upon the rear end of the tractor, a pivoted prop for supporting the forward end of the trailer when the trailer is detached, a separable fifth-wheel coupling connection for said tractor and trailer, slidably mounted for relative movement of the trailer and tractor when coupled, a pivoted actuator link connecting with said fifth-wheel and having a floating pivotal connection with the prop intermediate the prop and link fulcrums for a toggle organization, for shifting the prop with the motion of the fifth-wheel imparted by the said relative movement of tractor and trailer, and a stationary guide for positively guiding said link and prop at the union in the movements of the prop to trailer supporting or non-supporting position.

20. In a trailer vehicle having rear ground wheels, a pivoted prop for supporting the front end of the trailer, a pivoted actuator lever having a floated pivoted connection with the prop intermediate the frame and lever fulcrums for a toggle organization, a stationary guide on said trailer for positively guiding said frame and lever at their union in a definite direction for elevating and lowering said prop.

21. In a tractor-trailer combination, trailer brakes and props, motion translating mechanism respectively therefor, coupling members constituting an actuator when the coupling is established for said translating mechanisms, movable in relation to the trailer frame in correspondence with the tractor-trailer relative movement, and a releasable latch on the trailer frame for holding the actuator in fixed relation thereto at draft position.

22. In a tractor-trailer combination, trailer brakes and props, motion translating mechanisms respectively therefor, an actuator connected thereto and slidable in relation to the trailer frame, a fifth-wheel king pin coupling member rockingly supported by said actuator, means normally holding said trailer fifth-wheel in tilting position when the trailer is disconnected, inclined skids on the tractor leading to a horizontal bearing member for the trailer fifth-wheel, a coupling member on the tractor, a latch holding the fifth-wheel in tilted position when the actuator is in its forward position, means releasing said latch when the fifth-wheel plate is tilted to horizontal position for establishing the coupling, and a second releasable latch on the trailer frame for holding the actuator in fixed relation thereto at rearward or draft position.

23. In a tractor-trailer combination, trailer brakes and props, motion translating mechanisms respectively therefor, an actuator connected thereto and slidable in relation to the trailer frame, a fifth-wheel king pin coupling member rockingly supported by said actuator, means normally holding said trailer fifth-wheel in tilting position when the trailer is disconnected, and thereby holding said actuator in a fixed position, inclined skids on the tractor leading to a horizontal bearing member for the trailer fifth-wheel, a coupling member on the tractor, a latch holding the fifth-wheel in tilted position when the actuator is in its forward position, means releasing said latch when the fifth-wheel plate is tilted to horizontal position for establishing the coupling, and a second releasable latch on the trailer frame for holding the actuator in fixed relation thereto at rearward or draft position.

24. In a tractor-trailer sub-combination, a fifth-wheel coupling member having a sliding motion in relation to the trailer frame and a rocking motion in relation to the inclined skids and platform of the tractor, a latch holding the fifth-wheel member tilted and in fixed relation to the trailer frame at its forward position and releasable when the fifth-wheel is skidded into horizontal plane for coupling, a second latch for holding the fifth-wheel in fixed relation to the trailer frame at rearward or draft position, trailer brakes and props, and translating means therefor operated by the forward and rearward sliding movement of the trailer fifth-wheel when the coupling is established.

25. In combination with a tractor-trailer, trailer brake mechanism, trailer props movable in relation to the trailer frame, a fifth-wheel bearing plate and coupling member on the tractor, an actuator frame slidable on the front end of the trailer, a fifth-wheel member articulating in relation to the frame and bodily movable therewith formed with a king pin member to be coupled with said tractor coupling member, said actuator frame and fifth-wheel being movable to a forward coupling and uncoupling position and rearwardly to a draft position, a releasable latch for holding said actuator frame in fixed relation thereto at draft position, a second releasable latch for holding said frame in its forward position, means for releasing said second latch prior to the establishment of the coupling, and translating mechanisms operatively connecting said frame with the trailer props and brakes.

26. In a tractor-trailer combination, trailer brakes and props, a trailer coupling member movable longitudinally in relation to the trailer frame and operatively connected to said trailer props and brakes, a cooperating coupling member on the tractor, a releasable latch for holding the trailer coupling member in fixed relation to the trailer frame at draft position, an operating mechanism on the tractor brought into juxtaposition with the latch in draft position for releasing said coupling member enabling it to move forward to apply the brakes and to ground the props prior to the uncoupling, and means on the tractor for uncoupling when the said trailer coupling member is in its forward position.

27. In a device of the class described, in combination with a truck skid-chassis and a fifth-wheel, a two wheel trailer having a brake mechanism and supporting prop movable in relation to the trailer frame, a trailer king pin fifth-wheel movable in relation to the trailer frame and adapted to be superposed in registry with the truck fifth-wheel, coupling members on the truck fifth-wheel for automatically interlocking the king pin and moving the trailer fifth-wheel in the backing action of the truck, means translating said relative movement of the trailer fifth-wheel to lower the prop and to release the brakes, means automatically latching the trailer fifth-wheel to the trailer frame in its rearward draft position, and a manual control on the truck for effecting interlock releases enabling the forward action of the truck to reverse the prop brake and coupling operations.

28. A semi-trailer adapted for co-action with a skid chassis fifth-wheel type truck and comprising brake mechanism, prop mechanism and a king pin fifth-wheel movable in relation with the trailer frame, means translating rear fifth-wheel movement to operate the prop, means translating the relative movement to operate the brake, and means for automatically latching the fifth-wheel in its draft position in relation to the frame.

29. In a semi-trailer of the class described, in combination with brake operating mechanism and with prop operating mechanism, a king pin fifth-wheel movable in relation to the trailer frame, means translating said relative motion to the brake operating mechanism, means translating said relative movement to the prop operating mechanism, and an automatic latch on the trailer frame for locking the fifth-wheel in its draft position and formed with an interlocking surface concentric to the king pin when the fifth-wheel is latched to the frame.

30. In a vehicle unit comprising a semi-trailer supported at its front end upon the frame portion of a truck, a two-fold draft coupling comprising as a primary member a king pin fifth-wheel mechanism and coupling jaws, and a secondary member comprising a latch on the trailer member concentrically interlocking with a peripheral portion of the fifth-wheel mechanism when the coupling is effected.

31. In a vehicle unit comprising a semi-trailer supported at its front end upon the frame portion of a truck, a two-fold draft coupling comprising as a primary member a king pin fifth-wheel mechanism and coupling jaws, a secondary member comprising a latch on the trailer member concentrically interlocking with a peripheral portion of the fifth-wheel mechanism when the coupling is effected, means for automatically operating said latch when the trailer is backed to effect the coupling, and manual means for releasing said latch preparatory to uncoupling the king pin mechanism.

32. In combination with the separable fifth-wheel members of a semi-trailer and a truck, a latch movable on the trailer frame adapted to automatically interlock with the fifth-wheel unit when the draft coupling is established, said latch comprising a segmental member concentric with the fifth-wheel when the trailer and truck are coupling, means holding said segment in latched position when the coupling is made, and means manually operated from the truck for releasing said segment and means for disengaging the latch when released and means for completing the uncoupling thereafter.

33. In combination with a truck and its fifth-wheel member, a semi-trailer and its fifth-wheel member, brakes and brake operating mechanism on the trailer, props and prop operating mechanism on the trailer, coupling and uncoupling mechanism, said trailer fifth-wheel member being movable in its relation to the frame, mechanism translating the trailer fifth-wheel member to the brake operating mechanism, mechanisms transmitting the trailer fifth-wheel motion to the prop operating mechanism, means rendering said uncoupling mechanism ineffective in one position of the trailer fifth-wheel member, and means rendering said uncoupling mechanism operative in the other or draft position of the trailer fifth-wheel member.

34. In combination with a truck and its fifth-wheel member and a semi-trailer and its fifth-wheel member, brakes and brake operating mechanism on the trailer, prop and prop operating mechanism on the trailer, coupling and uncoupling mechanism, means movably supporting the trailer fifth-wheel member to be actuated by the relative movement of the truck to the trailer, said fifth-wheel member having one position in relation to the trailer frame for the coupling and uncoupling act and a second position for taking the draft, means translating the motion of said fifth-wheel member between the two said positions to the brake operating mechanism, means translating said motion of the fifth-wheel trailer member to the prop operating mechanism, means rendering the uncoupling mechanism ineffective in its initial position, and means for rendering said uncoupling mechanism operative when the trailer fifth-wheel is in its other or draft position.

35. In a vehicle unit comprising a semi-trailer supported at its front end upon the frame portion of a truck, a two-fold draft coupling comprising as a primary member a king pin fifth-wheel mechanism and coupling jaws, a secondary member comprising a latch on the trailer member concentrically interlocking with a peripheral portion of the fifth-wheel mechanism when the coupling is effected, and means for secondarily latching or interlocking the trailer frame and the fifth-wheel member when in the draft position.

36. In combination with a truck and its fifth-wheel member, a semi-trailer and its fifth-wheel member, brakes and brake operating mechanism on the trailer, props and prop operating mechanism on the trailer, coupling and uncoupling mechanism, said trailer fifth-wheel member being movable in its relation to the frame, mechanism translating the trailer fifth-wheel member to the brake operating mechanism, mechanisms transmitting the trailer fifth-wheel motion to the prop operating mechanism, means rendering said uncoupling mechanism ineffective in one position of the trailer fifth-wheel member, means rendering said uncoupling mechanism operative in the other or draft position of the trailer fifth-wheel member, and means for operating the brake operating mechanism from the truck when the trailer fifth-wheel member is in draft position.

37. In a trailer, a swinging supporting element, a slidable and tiltable fifth-wheel for coupling the trailer to a tractor when in horizontal position, said fifth-wheel being tiltable to and from a horizontal plane, a trailer frame member releasably latching the fifth-wheel in tilted position and mechanism connecting said supporting element and fifth-wheel, said fifth-wheel actuated by a tractor in coupling and uncoupling whereby said suppporting element is positively moved into operative or inoperative position.

38. In a trailer, brake mechanism for the wheels of the trailer, a slidable and tiltable fifth-wheel at the forward end of the trailer for coupling to a tractor when in horizontal position, said fifth-wheel being tiltable to and from a horizontal plane, a trailer frame member releasably latching the fifth-wheel in tilted position, mechanism connecting said brake mechanism and fifth-wheel, said fifth-wheel actuated by a tractor in coupling and uncoupling whereby said brake mechanism is positively moved into operative or inoperative position.

39. In a trailer, a tilting fifth-wheel member slidably mounted upon the forward end of the trailer, said member, provided with means for immovably locking said member when in a tilted position.

40. In a trailer, a tilting fifth-wheel member slidably mounted upon the forward end of the trailer, said member, provided with means for immovably locking said member when in a tilted position, and means for immovably locking said member when in a normal draft position.

41. In a tractor trailer adapted for automatic coupling, trailer brakes, props to be raised and lowered, a tractor fifth wheel plate, a trailer fifth-wheel plate operatively connected to said brakes and props, the fifth wheel assembly when coupled being movable in the line of draft in relation to the trailer frame for operating said props and brakes, and a latch for said fifth wheel assembly locking the same in draft position.

42. In a tractor trailer adapted for automatic coupling, trailer brakes, props for the forward end of the trailer adapted to be raised and lowered, a coupling fifth wheel for pivotally connecting the tractor and trailer, one member thereof carried by the tractor and the other by the trailer, the member carried by the trailer movable independently upon the trailer for actuating said brakes and props.

43. In a tractor trailer adapted for automatic coupling, trailer brakes, a prop for the forward end of the trailer adapted to be raised and lowered, a coupling for pivotally connecting the tractor and trailer, one member thereof carried by the trailer and the other by the tractor separable in the line of draft for uncoupling, the member carried by the trailer movable by the tractor independently of the trailer for actuating said brakes and props.

44. In a tractor trailer adapted for automatic coupling, trailer brakes, trailer props to be raised and lowered, a trailer fifth-wheel and coupling member relatively movable in the line of draft, and operatively connected to the props and brakes, a tractor coacting fifth-wheel and coupling member, and means whereby the tractor can couple with and operatively shift said trailer fifth-wheel member at an angle to the line of draft.

45. In a tractor trailer adapted for automatic coupling and having means actuated by relative tractor-trailer movement adapted to automatically operate trailer brakes and props, means enabling the vehicles to be coupled and the brakes and props operated at an angle to the line of draft comprising, a trailer fifth-wheel member movable in relation thereto for translating relative movement into brake and prop operations, a tractor fifth-wheel member comprising a coupling member, said fifth-wheel and coupling members on the tractor-trailer being formed with a guide structure diverging radially outward from the coupling axis to provide a relatively wide coupling receiving throat engageable at an angle to the line of draft.

46. In a tractor trailer adapted for automatic coupling, trailer brakes, trailer props to be raised and lowered, a trailer fifth-wheel and coupling member relatively movable in the line of draft and operatively connected to the props and brakes, a tractor coacting fifth-wheel and coupling member rendering the said trailer fifth-wheel member operative when the coupling is established and inoperative upon uncoupling, and means whereby the tractor can couple with and operatively shift said tractor fifth-wheel member at an angle to the line of draft.

In witness whereof, I hereunto subscribe my name.

RUFUS B. JONES.